No. 744,415. PATENTED NOV. 17, 1903.
W. A. SCHONFELD & A. STENHOUSE.
UMBRELLA.
APPLICATION FILED AUG. 27, 1903.
NO MODEL.

Witnesses:
Inventors
W. A. Schonfeld.
A. Stenhouse.
By L. B. Coupland.
Atty.

No. 744,415. Patented November 17, 1903.

UNITED STATES PATENT OFFICE.

WILLIAM A. SCHONFELD AND ALEXANDER STENHOUSE, OF CHICAGO, ILLINOIS.

UMBRELLA.

SPECIFICATION forming part of Letters Patent No. 744,415, dated November 17, 1903.

Application filed August 27, 1903. Serial No. 170,960. (No model.)

*To all whom it may concern:*

Be it known that we, WILLIAM A. SCHONFELD and ALEXANDER STENHOUSE, citizens of the United States, residing at Chicago, in the county of Cook and State of Illinois, have invented new and useful Improvements in Umbrellas, of which the following is a specification.

This invention relates to improvements in umbrellas, and has for its object to provide an arrangement for conveniently securing the inner or pivot ends of the frame-ribs and stretcher-rods in place so that each has an individual pivotal connection and action and also to facilitate the making of repairs.

Figure 1:
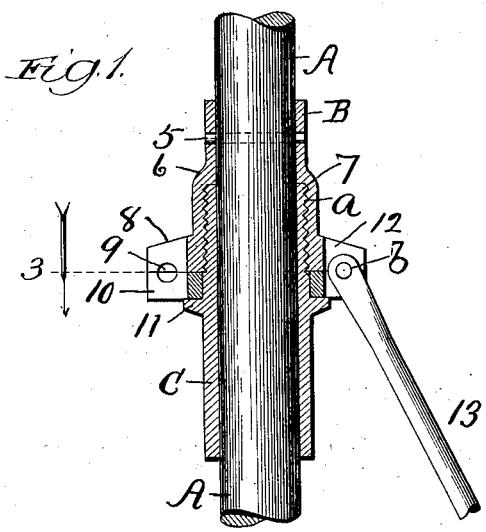
Figure 3:
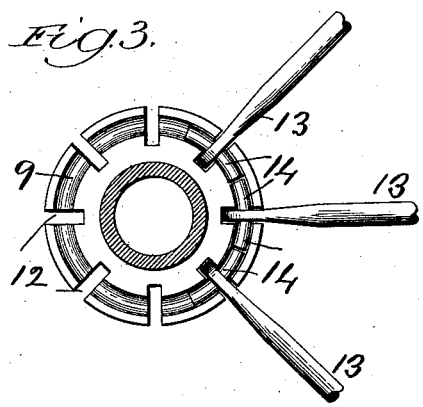
Figure 2:
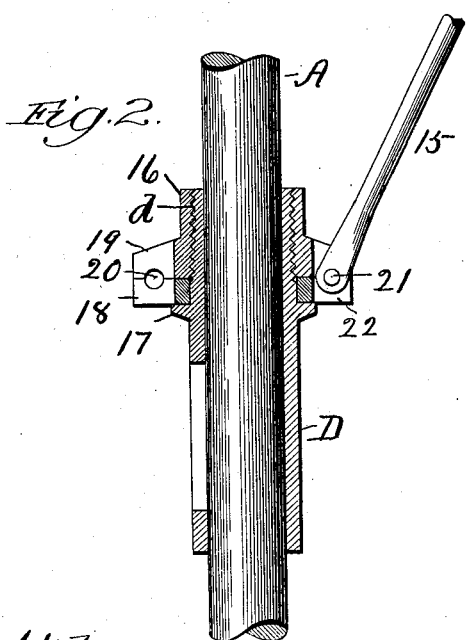
Figure 4:
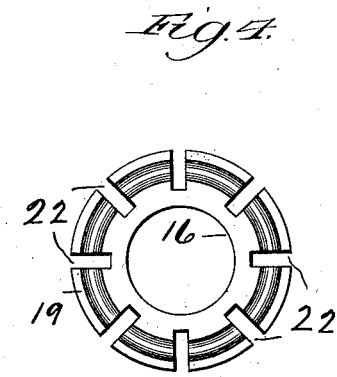

In the drawings, Figure 1 is a longitudinal section of the parts embodying the improved features. Fig. 2 is a similar view of the runner part. Fig. 3 is a transverse section on line 3, Fig. 1, looking in the direction indicated by the arrow; and Fig. 4 is a bottom plan of the exterior sleeve on the runner part.

A represents the usual umbrella-stick, and B a socket-tip mounted thereon and rigidly secured in place by a pin 5. The upper end of the socket B closely embraces the stick, but the lower half from the shoulder 6 downward is of a greater diameter to provide an annular socket-chamber 7, which is screw-threaded interiorly, as at $a$, for the engagement of the correspondingly upper threaded end of a detachable sleeve C, as shown in Fig. 1. The socket part B is provided with annular flange 8, having half of an annular groove 9, formed in the under side thereof. A bearing-ring 10 is loosely mounted on sleeve C and rests on an annular shoulder 11 formed thereon. This ring is provided in its upper side with the other half of groove 9, as shown in Figs. 1 and 3. The flange on the socket B and ring 10 have a number of notches 12 cut in the respective edges thereof for the reception of the inner flattened ends of the frame-ribs 13, which are perforated, as at $b$, for the insertion therethrough of the segmental pivot-pins 14, which rest loosely in groove 9 and provide an independent movement-bearing for each individual rib. In assembling the tip parts the sleeve C and the ring 10, loosely carried thereon, are first slipped down from the tip-end of the umbrella-stick and then followed by the socket B, which is rigidly fastened in place. The sleeve is next made to engage with the socket and screwed upward until just sufficient space is left between the flange on the socket-piece and the ring 10 for the convenient insertion of the ends of frame-ribs, each carrying its pivot-pin. When the ribs are all in place, the sleeve is screwed up tightly, as shown in Fig. 1. When repairs are necessary by reason of a rib having been bent, broken, or the pivot end rusted out, a new rib may be readily inserted by slacking down on sleeve C, the old pivot-pin being used for the new rib. The runner-fittings provide the same kind of a pivotal connection for the inner ends of the stretcher-rods 15 and are duplicate parts of the tip-fittings with the exception of the socket B, which in the runner construction is an exterior sleeve 16, open at both ends. This sleeve is screw-threaded interiorly, as at $d$, for the engagement of the runner-sleeve D, threaded exteriorly along its upper end. The sleeve D is provided with a shoulder 17, on which loosely rests a bearing-ring 18. The sleeve 16 is provided with a flange 19, an annular groove 20 being formed in the adjacent surfaces of this sleeve and the sleeve D for the reception of the pivot-pins 21, loosely connecting the inner ends of the stretcher-rods, but one of which is shown. The flange 19 and ring 18 are provided with the usual notches 22. The operation of making repairs in connection with the runner part and stretcher-rods is the same as that already described, so that a repetition is not necessary.

This arrangement provides an individual pivot connection for each rib and stretcher. The pivot-pins being loose and the connection of the frame parts being also loose insures a free flexure movement in the joints and prevents cramping, which is often the cause of the ribs being bent or broken and the fabric cover torn. Repairs may be made by any person with ease and facility, and one rib may be taken out and replaced without disconnecting the others, and the umbrella may be opened and closed with but little effort.

Having thus described our invention, what we claim, and desire to secure by Letters Patent, is—

1. In an umbrella-fitting, a socket screw-threaded interiorly and provided with a flange having an annular groove, an engaging sleeve provided with an annular shoulder, a bearing-ring carried loosely on said shoulder and having a groove in line with and corresponding to the groove in the socket part, and the pivot-pins loosely retained in the grooved parts and providing an independent pivotal connection for each of the ribs and stretcher-rods.

2. In an umbrella, a socket threaded interiorly and provided in the under side with an annular groove, a sleeve having a threaded engagement with the socket part, a loose bearing-ring interposed between the socket and engaging sleeve and provided with a groove corresponding to the groove in said socket, the pivot-pins loosely retained in the grooved parts, and the ribs and stretcher-rods.

3. The combination with an umbrella-stick, of a socket provided with a groove in the under side and mounted thereon, a sleeve detachably engaging said socket, a ring carried loosely on said sleeve and grooved in the upper side, the pivot-pins held loosely in the grooved parts, and the ribs and stretcher-rods having their pivotal ends independently retained in place.

In testimony whereof we have signed our names to this specification in the presence of two subscribing witnesses.

WILLIAM A. SCHONFELD.
ALEXANDER STENHOUSE.

Witnesses:
VAIL R. BUCKLIN,
L. B. COUPLAND.